US010663637B2

(12) United States Patent
Randazzo

(10) Patent No.: US 10,663,637 B2
(45) Date of Patent: May 26, 2020

(54) OPTICALLY VARIABLE FILM, APPARATUS AND METHOD FOR MAKING THE SAME

(71) Applicant: Illinois Tool Works Inc., Glenview, IL (US)

(72) Inventor: Dean Randazzo, Seabrook, NH (US)

(73) Assignee: Illinois Tool Works Inc., Glenview, IL (US)

( * ) Notice: Subject to any disclaimer, the term of this patent is extended or adjusted under 35 U.S.C. 154(b) by 123 days.

(21) Appl. No.: 15/604,223

(22) Filed: May 24, 2017

(65) Prior Publication Data

US 2017/0343717 A1 Nov. 30, 2017

Related U.S. Application Data

(60) Provisional application No. 62/342,408, filed on May 27, 2016.

(51) Int. Cl.
*G02B 5/32* (2006.01)
*G03H 1/02* (2006.01)
(Continued)

(52) U.S. Cl.
CPC ............ *G02B 5/32* (2013.01); *B23K 26/0006* (2013.01); *B23K 26/352* (2015.10);
(Continued)

(58) Field of Classification Search
CPC ............ B23K 2101/34; B23K 2101/36; B23K 2103/42; B23K 26/0006; B23K 26/352; B23K 26/354; B23K 26/355; B23K 26/362; G02B 1/04; G02B 5/1857; G02B 5/32; G02B 3/00; G03H 1/0244; G03H 1/0402;
(Continued)

(56) References Cited

U.S. PATENT DOCUMENTS

| 6,388,780 B1 | 5/2002 | Monaghan et al. |
| 2002/0054403 A1 | 5/2002 | Monaghan et al. |
| 2005/0112472 A1* | 5/2005 | Kutsch ................ G03H 1/028 |
| | | 430/1 |

FOREIGN PATENT DOCUMENTS

| EP | 1715392 A1 | 10/2006 |
| WO | 2006003457 A1 | 1/2006 |

OTHER PUBLICATIONS

International Preliminary Report on Patentability issues by International Bureau in connection with PCT/US2017/034447 dated Dec. 6, 2018.

(Continued)

*Primary Examiner* — Jade R Chwasz
(74) *Attorney, Agent, or Firm* — Levenfeld Pearlstein, LLC

(57) ABSTRACT

An apparatus for producing an optically variable film includes a laser configured to emit a beam, a telescoping lens section having a first lens and a second lens spaced apart by a first distance and an interferometer configured to direct the beam toward a workpiece. The laser may be operated at a predetermined power level and the first and second lenses are sized and spaced relative to one another to direct the beam onto the workpiece at about 200-230 dots per inch. The workpiece may include a polyethylene terephthalate (PET) layer configured to be ablated by the beam, forming a microstructure in the surface of the layer. The microstructure may be randomized and used to present non-chroma visual effects.

6 Claims, 16 Drawing Sheets

(51) Int. Cl.
*G02B 5/18* (2006.01)
*B23K 26/354* (2014.01)
*B23K 26/00* (2014.01)
*B23K 26/352* (2014.01)
*B23K 26/361* (2014.01)
*G02B 1/04* (2006.01)
*G03H 1/04* (2006.01)
*G03H 1/22* (2006.01)
*B23K 103/00* (2006.01)
*B23K 101/36* (2006.01)
*B23K 101/34* (2006.01)

(52) U.S. Cl.
CPC .......... *B23K 26/354* (2015.10); *B23K 26/355* (2018.08); *B23K 26/361* (2015.10); *G02B 1/04* (2013.01); *G02B 5/1857* (2013.01); *G03H 1/0244* (2013.01); *G03H 1/0402* (2013.01); *G03H 1/0476* (2013.01); *B23K 2101/34* (2018.08); *B23K 2101/36* (2018.08); *B23K 2103/42* (2018.08); *G03H 2001/0296* (2013.01); *G03H 2001/0439* (2013.01); *G03H 2001/0441* (2013.01); *G03H 2001/0482* (2013.01); *G03H 2001/0497* (2013.01); *G03H 2001/2265* (2013.01); *G03H 2224/02* (2013.01); *G03H 2240/52* (2013.01); *G03H 2260/62* (2013.01)

(58) Field of Classification Search
CPC ......... G03H 1/0476; G03H 2001/0296; G03H 2001/0439; G03H 2001/0441; G03H 2001/0482; G03H 2001/0497; G03H 2001/2265; G03H 2224/02; G03H 2240/52; G03H 2260/62; G03H 1/00; G03H 3/00
USPC .......................................................... 359/15
See application file for complete search history.

(56) References Cited

OTHER PUBLICATIONS

Lee C-K et al., Optical Configuration and Color-Representation Range of a Variable-Pitch Dot Matrix Holographic Printer, Applied Optics, Jan. 1, 2001, pp. 40-53, vol. 39 No. 1, Optical Society of America, Washington, DC.
International Search Report issued by ISA/EPO in connection with PCT/US2017/034447 dated Oct. 26, 2017.

* cited by examiner

Measured feature height 629 nm

Measured feature height 642 nm

Measured feature height 546 nm

Z Calibration Check

OPTICALLY VARIABLE FILM, APPARATUS AND METHOD FOR MAKING THE SAME

BACKGROUND

The present disclosure relates generally to techniques for producing an optically variable film, an apparatus and a method for making the film.

Holographic Optical Elements (HOE) may be formed by creating diffraction gratings in a substrate. An early method to produce diffraction gratings utilized ruling engines that would scribe, line by line, with a diamond tipped stylus, the grooves to produce the diffraction grating. The scribing was typically done in metals and was very time consuming.

Another method of forming HOE involves creating interference patterns or gratings in a surface, which, when viewed, gives rise to holographic visual effects. One method of creating interference patterns involves selectively exposing regions of photosensitive material to interfering beams of illumination. The exposed regions of material become insoluble and the unexposed regions are dissolved away, leaving a desired pattern on the material. This method may be enhanced with e-beam exposures to reshape a sinusoidal structure creating blazed grating profiles.

The patterns formed by the method above may be treated as the final holographic image, or may be used as a master to form other equivalent surfaces, for example, by embossing with heat and pressure or UV cast embossing. The master may be copied by electroforming in nickel or itself vacuum metalized to strengthen its surface before embossing to make the separate mechanical impression or impressions.

Another process to create interference patterns includes forming a plurality of pixels in a surface so that the holographic image is formed by an aggregate of the pixels. In such a process, two or more light beams are directed toward a surface to interfere with one another at a desired pixel location, thereby forming the diffraction grating pixel. Pixels may be individually formed across the surface to create an array of pixelated diffraction gratings. Computer programs may control both the interfering directionality of the illumination and the locations of the individual pixels.

The methods above rely on polymerization of the photosensitive material in creating the interference pattern or diffraction grating at each pixel location. This is time consuming and must be followed by a separate process to remove the unpolymerized portions of the material.

Still another process for creating diffractive microstructures is to use Space Light Modulators (SLM) or Micro-Mirror Devices illuminated with an expanded laser. In such a process, digital representations of line spacings are loaded into the devices and then minified by an optical system. By shrinking the spacings sufficiently, there is the potential to achieve diffraction. In addition, changing a digital file line angle and spacings while keeping minification constant will allow various grating angle and pitch changes, which may produce positional changes to the diffracted beam and a variety of diffractive orders, respectively. A depth of the diffraction grating may be controlled with timed exposure into either light sensitive materials or ablation.

Still another process includes using a laser to ablate a diffraction grating surface to directly form each pixel. Thus, no exposure of photosensitive material is required and no post-exposure treatment is needed to produce the desired pattern. In such a process, an interferometer head splits the laser beam into at least two parts, and then uses a set of angled mirrors to reunite these parts at the surface to ablate the interference pattern on the surface. The azimuthal orientations at which the beam parts reach the surface determine the direction of viewing at which the strongest holographic (rainbow) effect is perceived. To produce different effects at different pixel locations, the azimuthal orientation of the interferometer head relative to the surface has had to be changed intermittently, as well as the angular orientation of the individual mirrors, which form part of the interferometer head. However, due to the mass and inertia of the head, it is difficult to reorient with desired rapidity. Further, any vibrations encountered during reorientation can detract from an extremely high positional accuracy that is desired in order to yield suitable holographic imagery.

One example of a laser ablating system including an interferometer is described in U.S. Pat. No. 6,388,780 to Monaghan et al., incorporated herein by reference in its entirety, and commonly owned with the present application. In Monaghan et al., a pulsed laser beam is directed toward a beam splitter where the beam is split into a first half and a second half. Each beam half is directed along a path to a respective two-axis galvonometer and then to a respective prism. The beams are then directed through a recombiner or condensing lens system and directed to a common focal point on surface, to form a diffraction grating pixel.

In known systems, the surface material to be ablated is a suitable polyimide material. The polyimide ablates in a predictable manner that can be accurately controlled and reproduced through operation of the laser and interferometer to form a predetermined interference pattern or pixel array. That is, in known systems, the laser and interferometer may be operated to control formation properties of the interference pattern and/or pixels, by controlling, for example, depth and location of the diffraction gratings or pixels which form the pattern on the polyimide surface.

However, in the systems above, the holographic effect is multi-chroma, which displays a plurality of colors. For example, gratings formed in a film using the above techniques may reflect the visible spectrum of colors to provide a "rainbow" effect. In some applications, such an effect may be visually displeasing, distracting or otherwise undesirable or unsuitable for a particular application.

Accordingly, it is desirable to provide an optically variable film that may be manufactured as desired to present either multi-chroma or non-chroma visual effects, an apparatus for producing the film and a method of producing the film.

SUMMARY

According to one aspect, there is provided an apparatus for producing an optically variable film. The apparatus includes a laser configured to emit a beam, a telescoping lens section comprising a first lens and a second lens spaced apart by a first distance and an interferometer configured to direct the beam toward a workpiece. The laser is operated at a predetermined power level and the first and second lenses are sized and spaced relative to one another to direct the beam onto the workpiece at about 200-230 dots per inch.

According to another aspect there is provided a method of forming an optically variable film with an apparatus, the apparatus including a laser configured to emit a beam, a telescoping lens section having a first lens and a second lens spaced apart by a first distance and an interferometer configured to direct the beam toward a workpiece. The method includes operating the laser at a predetermined power level, selecting first and second lens focal lengths and determining the first distance, directing the beam toward the workpiece and ablating the workpiece with the beam to form a microstructure in the workpiece. The beam is emitted from the apparatus onto the workpiece at 200-230 dpi and the workpiece includes a layer of polyethylene terephthalate (PET) exposed to the beam and in which the microstructure is formed.

According to another aspect, there is provided a polyethylene terephthalate (PET) layer having a surface in which a microstructure is formed in response to exposure to a beam emitted from a laser, the microstructure including a randomized section having a plurality of peaks having different heights and valleys having different depths. The microstructure is configured to present a substantially non-chroma visual effect.

According to another aspect, there is provided an optically variable film having a base layer including a microstructure imprinted therein and a reflective layer extending of the base layer and microstructure and substantially matching a profile of the microstructure. The microstructure includes a randomized section having a plurality of peaks extending to different heights, valleys extending to different depths, and different slope magnitudes between adjacent peaks and valleys. The reflective layer, over the randomized section, produces a substantially non-chroma visual effect.

Other objects, features, and advantages of the disclosure will be apparent from the following description, taken in conjunction with the accompanying sheets of drawings, wherein like numerals refer to like parts, elements, components, steps, and processes.

DETAILED DESCRIPTION

Figure 1:
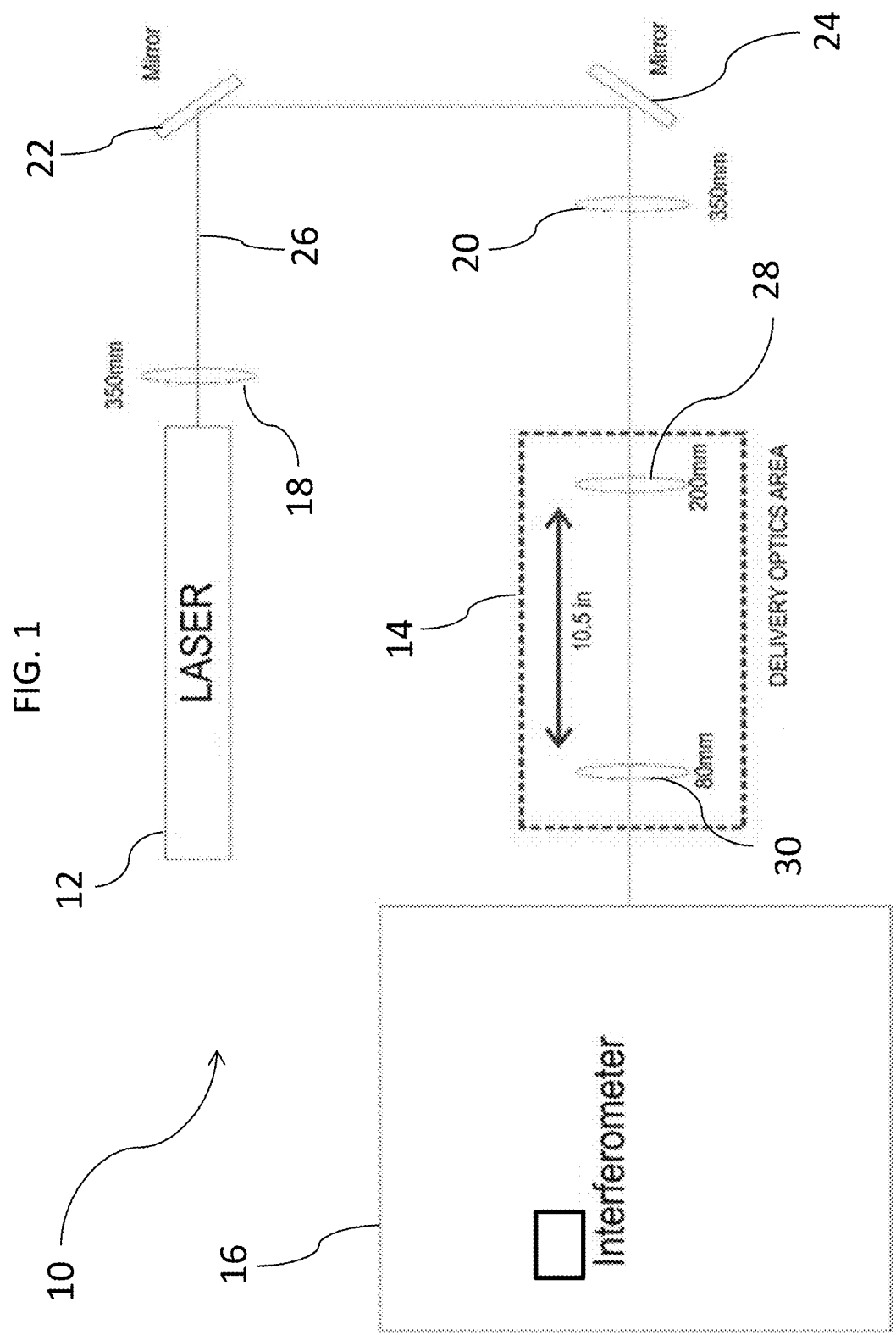
FIG. 1 is a schematic diagram representing an apparatus for forming an optically variable film according to an embodiment described herein.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

FIG. 1 is a schematic diagram of an apparatus 10 for forming an optically variable film according to an embodiment described herein. Referring to FIG. 1, the apparatus 10 includes, generally, a laser 12, a telescoping lens section 14 and an interferometer 16. The apparatus may further include one or more laser beam waist control lenses 18, 20 and one or more mirrors 22, 24 to direct a beam 26 from the laser 12 through the apparatus from the laser 12 to the interferometer 16.

In one embodiment, the laser 12 emits the beam 26 and the beam 26 subsequently travels through a first diameter control lens 18 of the one or more beam waist control lenses 18, 20. Subsequently, the beam 26 is directed by a first mirror 22 of the one or more mirrors 22, 24 toward a second mirror 24 of the one or more mirrors 22, 24. The second mirror 24 then directs the beam 26 toward a second diameter control lens 20. Thus, in one embodiment, the apparatus 10 may include two beam waist control lenses 18, 20 to control a diameter of a laser beam, and two mirrors 22, 24 to direct the laser beam 26 through the apparatus. However, it is understood that the present disclosure is not limited to such a configuration, and those having ordinary skill in the art will recognize that additional or fewer mirrors and/or additional or fewer beam waist control lenses may be used depending on a particular application. In a non-limiting embodiment, the beam waist control lenses may have a focal length of approximately 350 millimeters (mm).

In one embodiment, the laser 12 may be a 266 nanometer (nm) laser. That is, the laser 12 may emit a beam 26 having a wavelength of 266 nm. However, the present disclosure is not limited only to this type of laser, and lasers emitting beams of different wavelengths are envisioned as well. For example, a laser emitting a beam having a wavelength of 355 nm is also envisioned.

The telescoping lens section 14 includes a first lens 28 and a second lens 30, wherein one of, or both, the first and second lenses 28, 30 are movable relative to the other. Moving the first and second lenses 28, 30 relative to one another affects the energy of the beam 26 as it exits the telescoping lens section 14. In addition, the relative focal lengths of the first and second lenses 28, 30 may also affect the beam energy. Preferably, the first and second lenses 28, 30 are fused silica convex lenses.

In one embodiment, the first and second lenses 28, 30 may be axially aligned and positioned approximately 10.5 inches (in) from one another. Further, in one embodiment, the first lens 28 may have a focal length of approximately 200 mm and the second lens 30 may have a focal length of approximately 80 mm. The first lens 28 is positioned ahead of second lens 30 such that the beam 26 passes through the first lens 28 before passing through the second lens 30. It is understood, however, that the present disclosure is not limited to this example, and those having ordinary skill in the art will recognize that the distance between the first and second lenses 28, 30 and the focal lengths of the first and second lenses 28, 30 may be varied so long as the desired surface ablation and resulting visual effects, described further below, may still be achieved.

Further, according to the embodiments described herein, the laser 12, when implemented as a 266 nm laser, may be operated at or around 68%, or approximately 140 milliwatts (mW). However, the present disclosure is not limited thereto. For example, in some embodiments, the laser 12, as a 266 nm laser, may be operated at levels up to about 72% to achieve the desired surface ablation and resulting visual effects.

For comparison, in a known apparatus, for example, the apparatus disclosed in U.S. Pat. No. 6,388,780 to Monaghan et al., a 266 nm laser is operated at approximately 50% power when forming the multi-chroma hologram. In addition, the lenses in a telescope section of a known apparatus are typically about 180 mm and 50 mm in focal length. In the known configurations, laser spots are formed on a surface at up to approximately 200 dots per inch (dpi).

In the embodiments described herein, the beam 26 passes through the telescoping lens section 14 and into the interferometer 16. The interferometer 16 may be of a known variety apparent to those having skill in the art. The beam 26 is then directed onto a workpiece 32 to ablate a microstructure, such as a diffraction grating, into a surface of the workpiece 32 (see FIGS. 2-11, for example). With the configurations of the apparatus 10 disclosed herein, laser beam spots may be formed at resolutions up to approximately 230 dpi on the surface. In one embodiment, laser beam spots (pixels) may be formed at a resolution exceeding 200 dpi up to about 230 dpi. Because of the smaller pixel size, compared to conventional systems, energy from the beam may be more concentrated than in conventional systems. The smaller pixel size, may be attributed, at least in part, to increased power of the laser 12, increased focal lengths of the first and second lenses 28, 30 in the telescoping lens section 14, and the distance between the first and second lenses 28, 30 when compared to known configurations. In one embodiment, the beam 26 is split in the interferometer 16, such that split beams are emitted onto the workpiece 32 and interfere with each other to ablate the surface of the workpiece 32 to form the microstructure or diffraction grating thereon.

According to the embodiments described herein, the workpiece 32 may include, or be formed entirely as, a layer of polyethylene terephthalate (PET) or other similar material, and the ablated surface is formed on the layer of PET. PET is desirable in this application because it ablates at lower energy levels than the polyimide material used in known systems. In one embodiment the PET layer 34 may be approximately 7 mils thick. However, the present disclosure is not limited thereto and other suitable thicknesses and materials are envisioned. For example, other materials that ablate or melt at sufficiently low energy levels may be suitable as well.

In operation, according to one example, the apparatus 10 is configured as described above so that the first and second lenses 28, 30 are spaced apart by about 10.5 inches, the first lens 28 focal length is about 200 mm and the second lens 30 focal length is about 80 mm. The laser may be a 266 nm laser operated at about 68% power. With this configuration, the laser beam 26 may be sized to create an array of pixels at about 200-230 dpi, and in one embodiment, about 230 dpi, on the surface of the PET layer 34.

The surface of the PET layer 34 ablates at a lower energy than the polyimide surfaces used in known systems. Accordingly, the surface of the PET layer 34 may be more deeply ablated compared to polyimide surfaces. For example, in the embodiments described herein, the surface may be ablated to a depth of approximately 250 nm up to, and in some examples exceeding, 1 micron. In addition, as the PET is ablated, it begins to melt and the microstructure 36 formed in the surface of the PET layer 34 becomes randomized with different pitch frequencies and depths. That is, in response to exposure to the beam 26 a random or substantially random microstructure may be formed in the PET. Further, a general orientation of the microstructure may be rotated throughout 180 degrees. Thus, in response to exposure to the beam 26 as described above, a film may be formed having a randomized surface structure (i.e., diffraction grating or interference pattern).

The surface may also be double exposed. For example, the surface may be rotated relative to the apparatus 10, or vice versa, between exposures to the beam 26. In another embodiment, the surface may be held in the same orientation relative to the apparatus 10 for a double exposure, with a random microstructure 36 resulting from a second exposure modifying the microstructure 36 resulting from first exposure. It is understood that additional exposures, e.g., a third exposure or a fourth exposure, may be carried out as necessary to provide the desired visual effect.

The randomized nature of the microstructure 36 on the surface may be attributed to, for example, material properties of the PET together with the increased laser power and the configuration of the telescoping lens section 14 discussed above. The randomization of the microstructure 36 on the surface is a surprising and unexpected result from configuring and operating the apparatus 10 according to the parameters discussed above.

Figure 2:
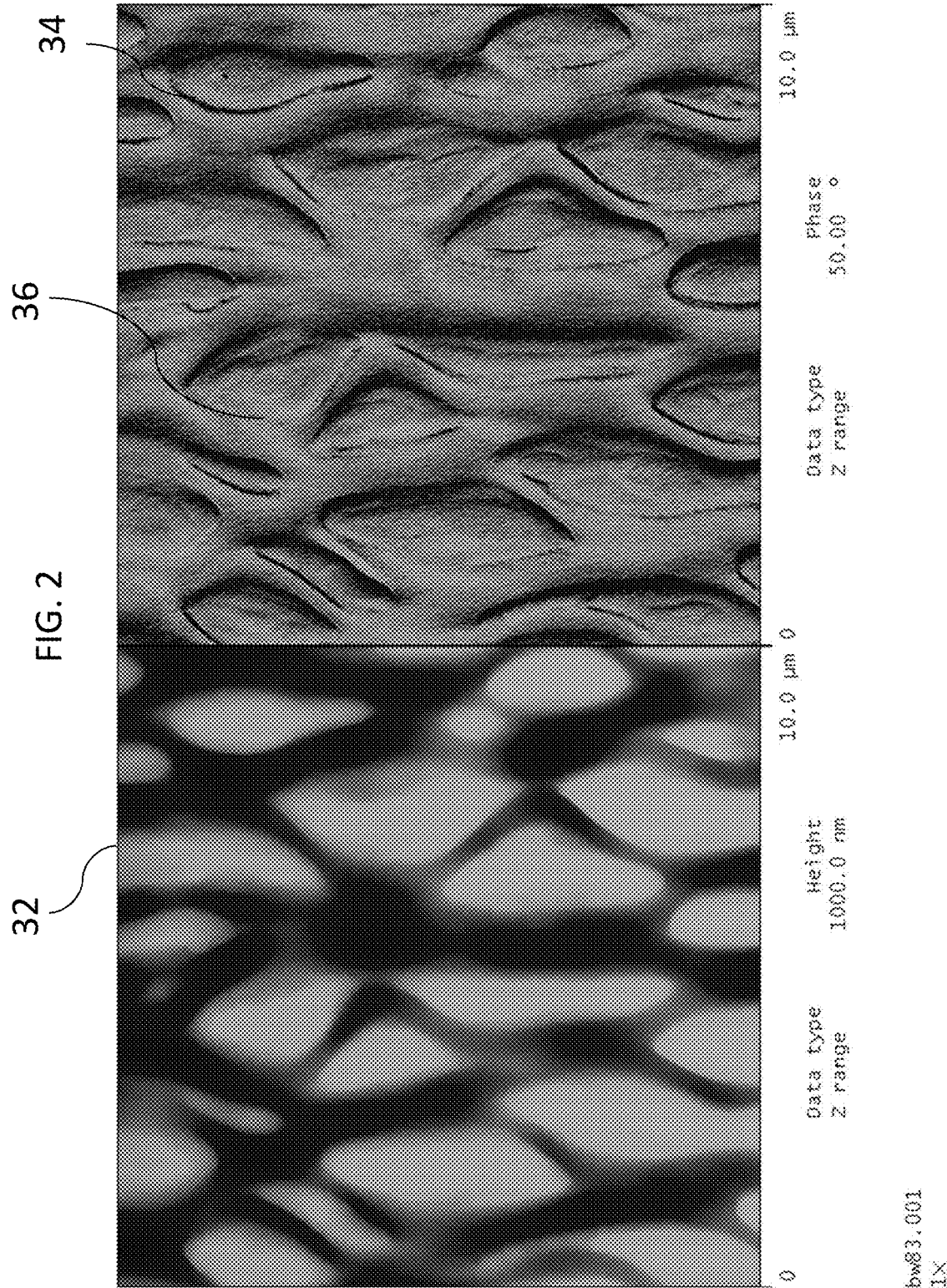
FIG. 2 is an example of the optically variable film according to one embodiment described herein.
Figure 3:
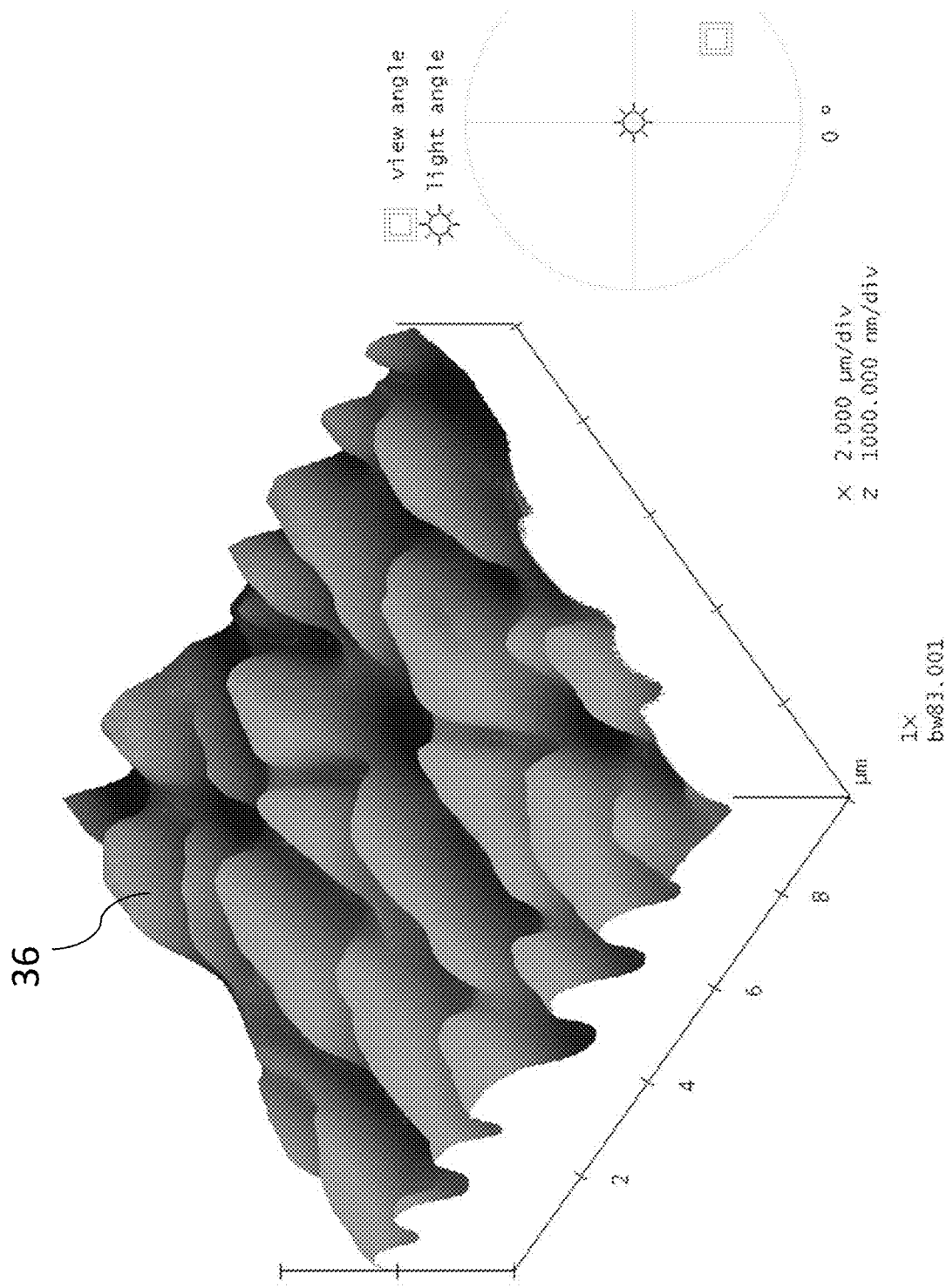
FIG. 3 is a model of the optically variable surface according to one embodiment described herein.
Figure 4:
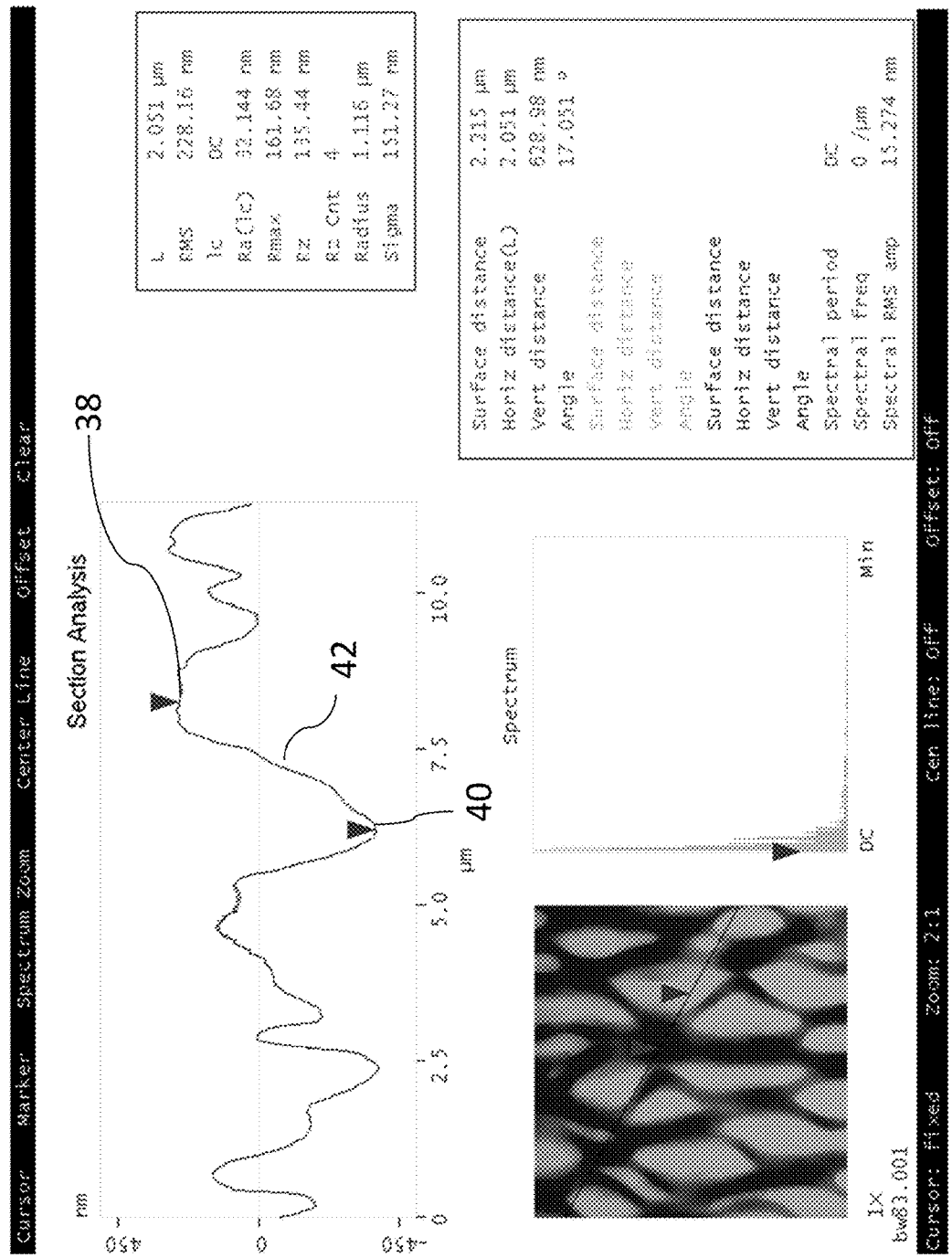
FIG. 4 is a graphical model of the optically variable surface according to one embodiment described herein.
Figure 5:
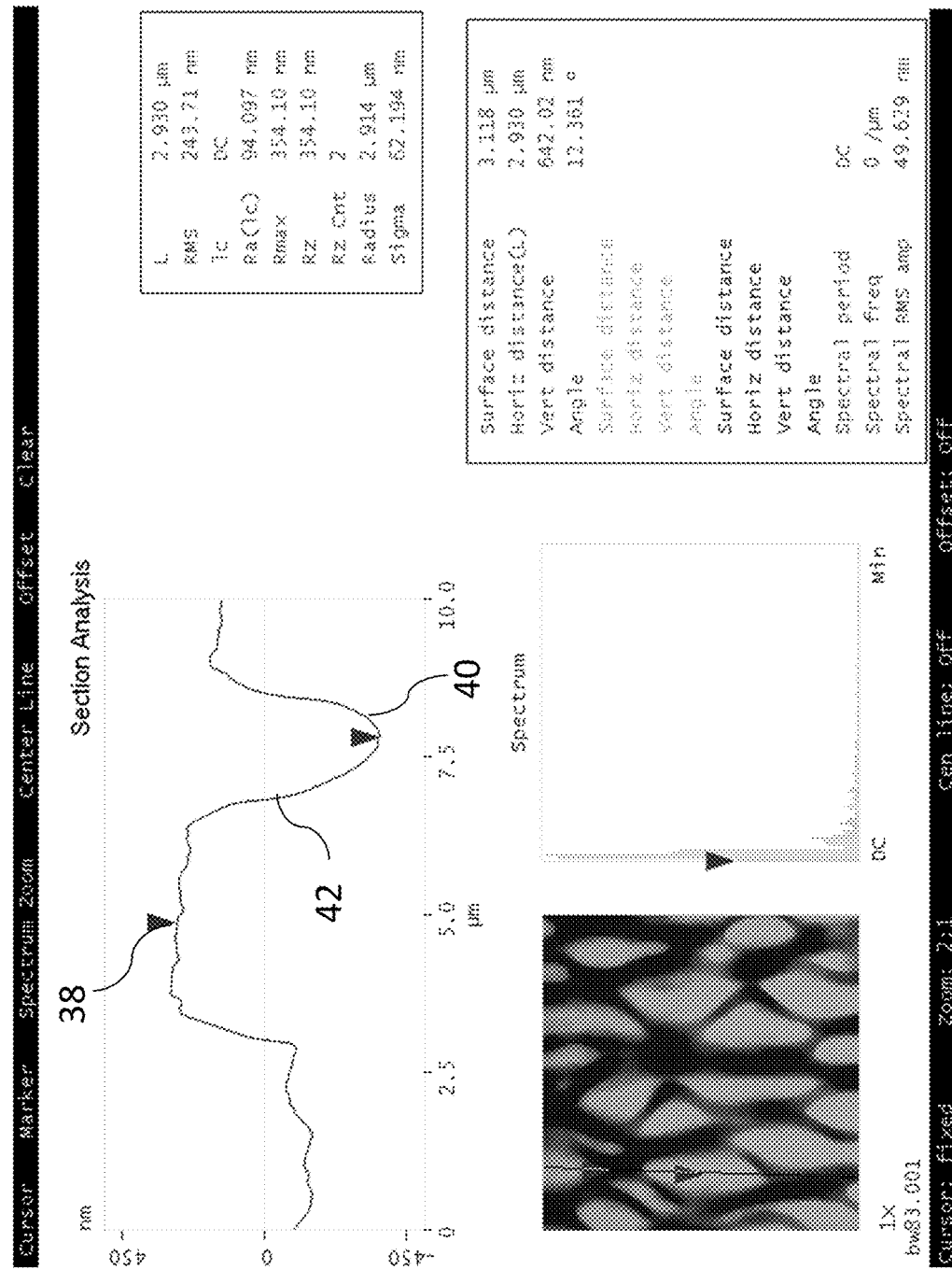
FIG. 5 is a graphical model of the optically variable surface according to one embodiment described herein.
Figure 6:
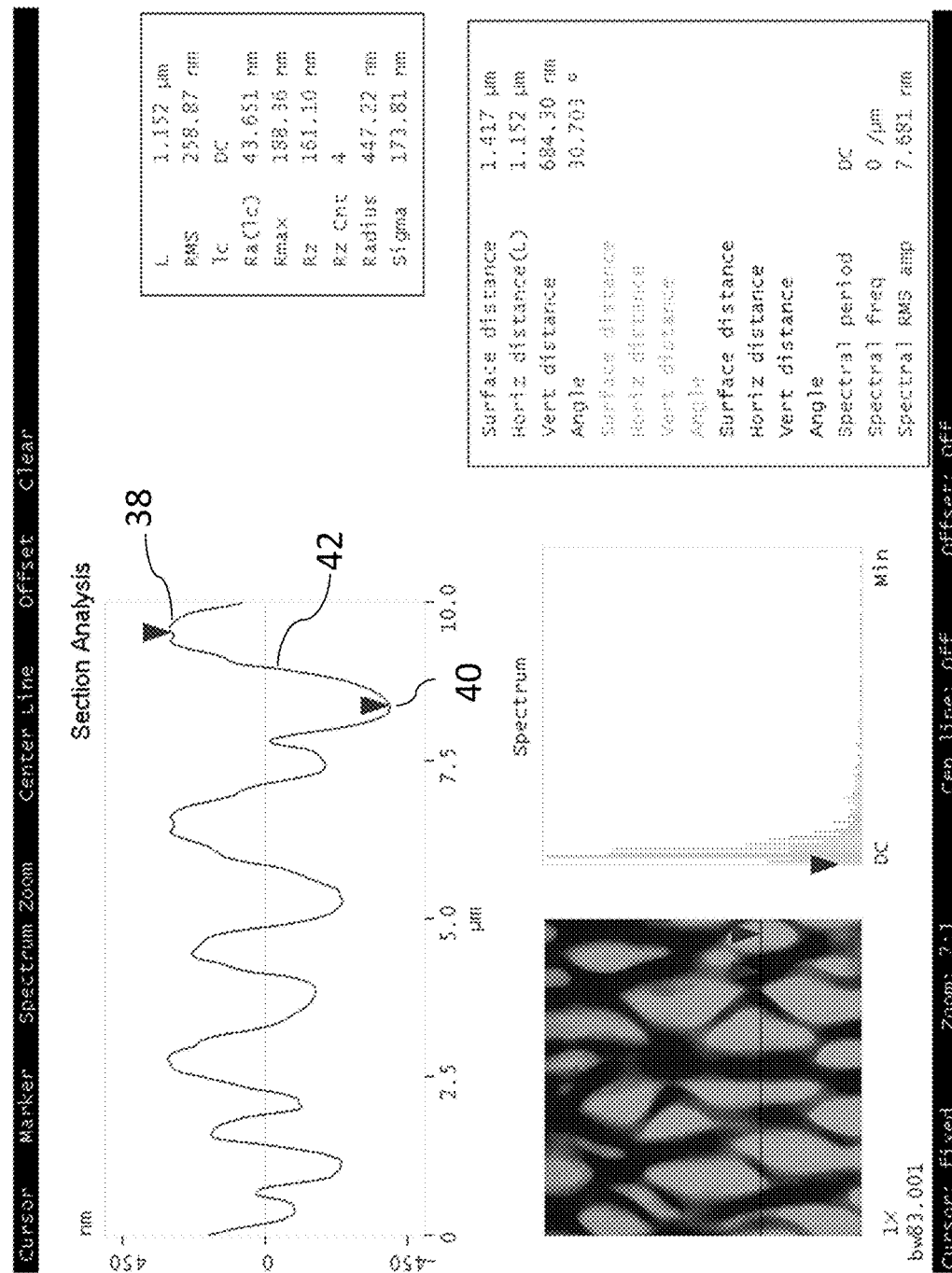
FIG. 6 is a graphical model of the optically variable surface according to one embodiment described herein.
Figure 7:
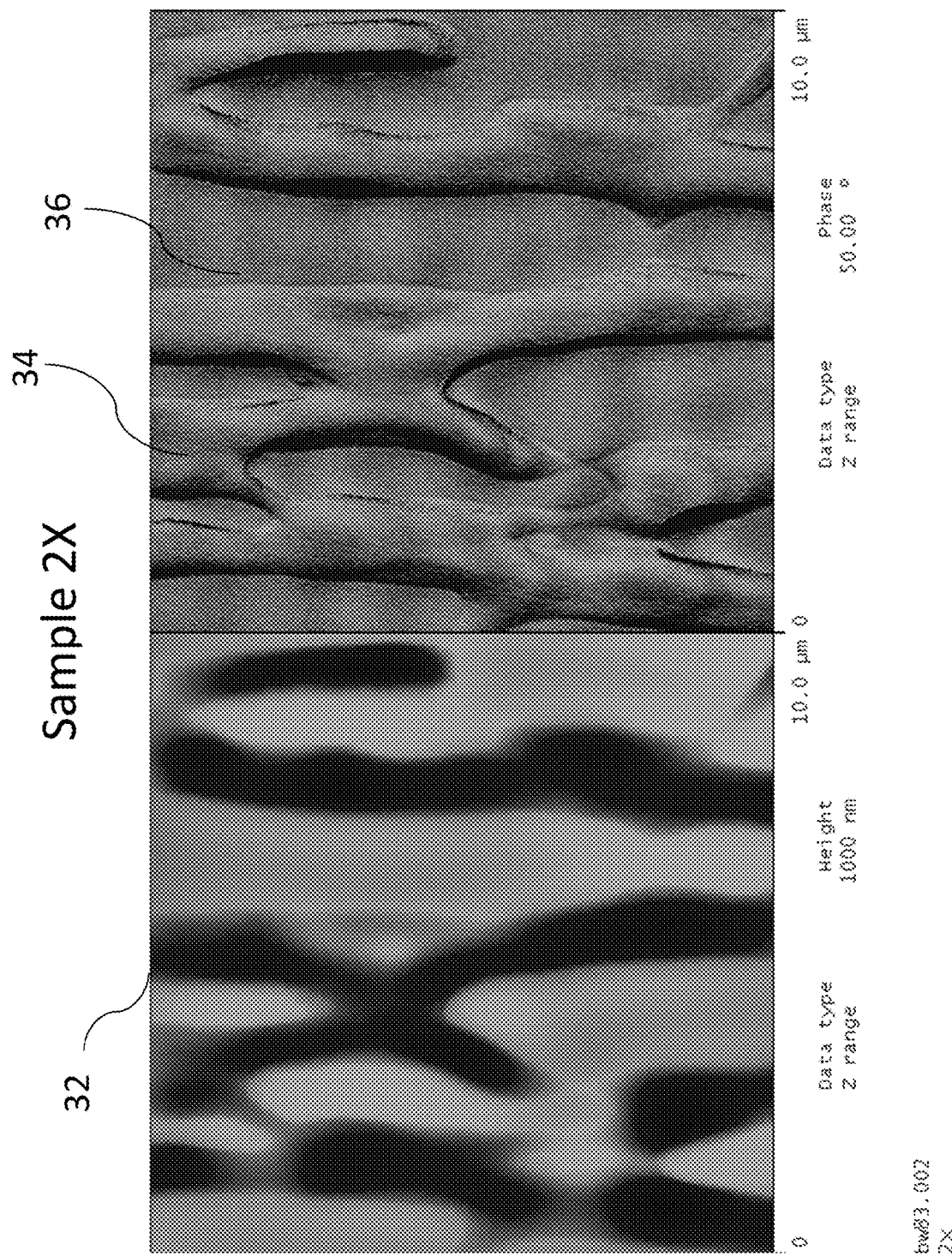
FIG. 7 is a magnified view showing examples of the optically variable film according to one embodiment described herein.
Figure 8:
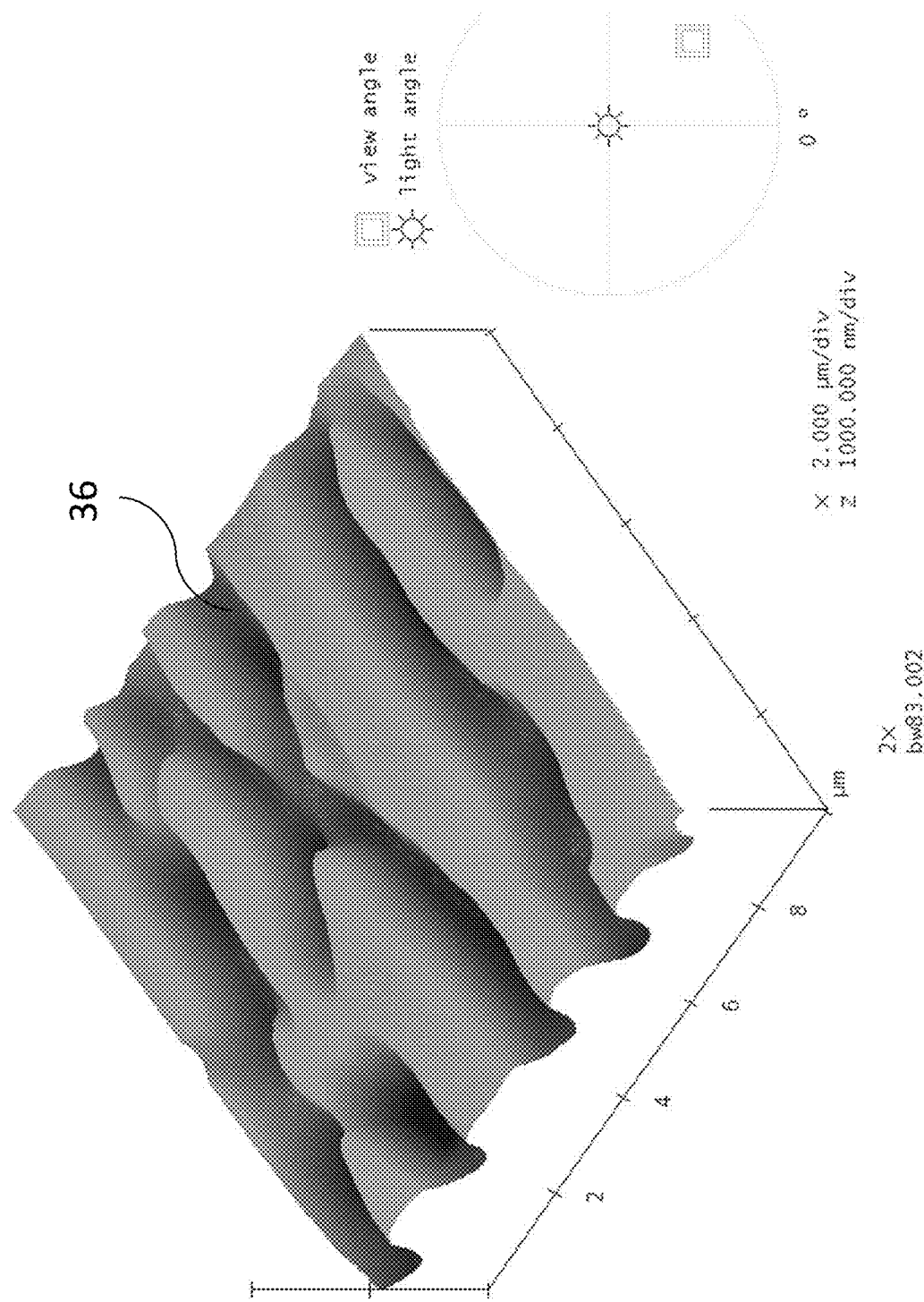
FIG. 8 is a model of the optically variable surface according to one embodiment described herein.

FIGS. 2-11 are various representations of the randomized microstructure 36 formed in the surface of the PET layer 34 by the apparatus 10 described above, according to embodiments described herein. For example, FIG. 2 is a plan view of the microstructure 36 formed in accordance with the embodiments described here and FIG. 3 is a model representing the microstructure 36 in the surface of the PET layer 34 formed by the apparatus 10 in accordance with the embodiments described here. FIGS. 4-6 are graphical representations taken at different sections along the surface to show a cross-sectional profile at height in the different directions.

Referring to the examples in FIGS. 2-6, according to one embodiment, the microstructure 36 may be formed having different peak heights and valley depths. This structure may result in different feature heights, i.e., the elevation between adjacent peaks and valleys, when viewed in cross-section at different areas, as shown in FIGS. 4-6, for example. For instance, as shown in FIG. 4-6, respectively, a feature height may be approximately 629 nm at one section, 642 nm at another section, and 684 nm at a third section. However, it is understood these values are provided for the purposes of example only, and different heights may be obtained at different locations or across different sections. Further, different feature heights may be obtained when ablating subsequent PET surfaces. The present disclosure is not limited to these examples.

Further, it is understood that these heights were formed randomly, i.e., were not predetermined, as a result of the PET melting in response to exposure to the beam 26. That is, the precise feature heights are not predetermined or precisely controlled. Rather, they result from a controlled exposure to a laser beam melting portions of the PET layer 34. Further still, the relative positioning and precise locations of the peaks 38, valleys 40, and the slopes 42 therebetween, are obtained randomly by way of the PET melting during or after exposure to the beam 26. Thus, in the embodiments above, the microstructure 36 obtained on the surface is not a predetermined, or predesigned structure that may be predictably formed and reproduced by maintaining the same manufacturing parameters. Rather, the surface structure is randomly obtained and may vary with each operation of apparatus 10 even when manufacturing parameters are maintained throughout the different operations. The randomized nature of the surface structure may produce non-chroma visual effects.

Figure 9:
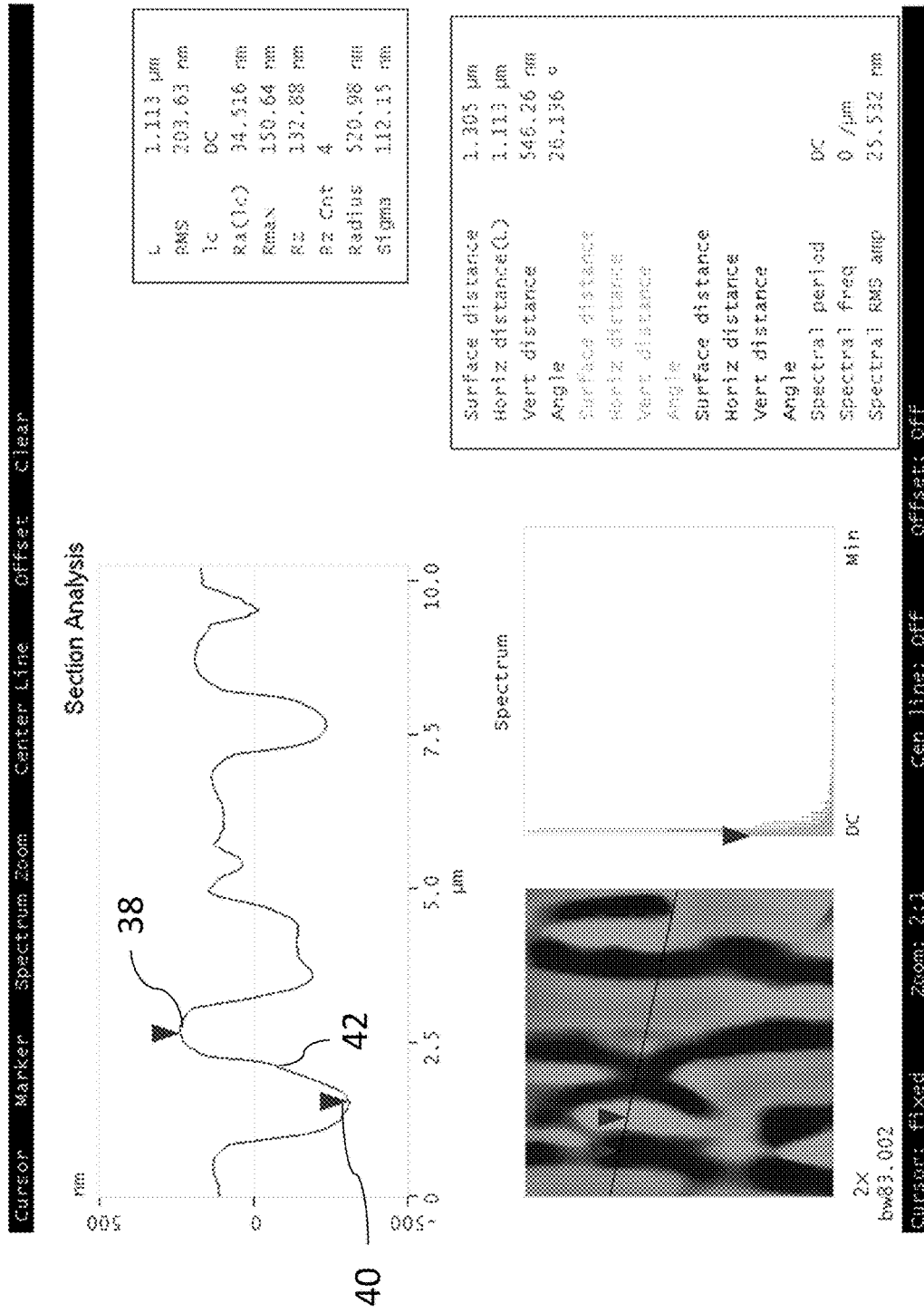
FIG. 9 is a graphical model of the optically variable surface according to one embodiment described herein.
Figure 10:
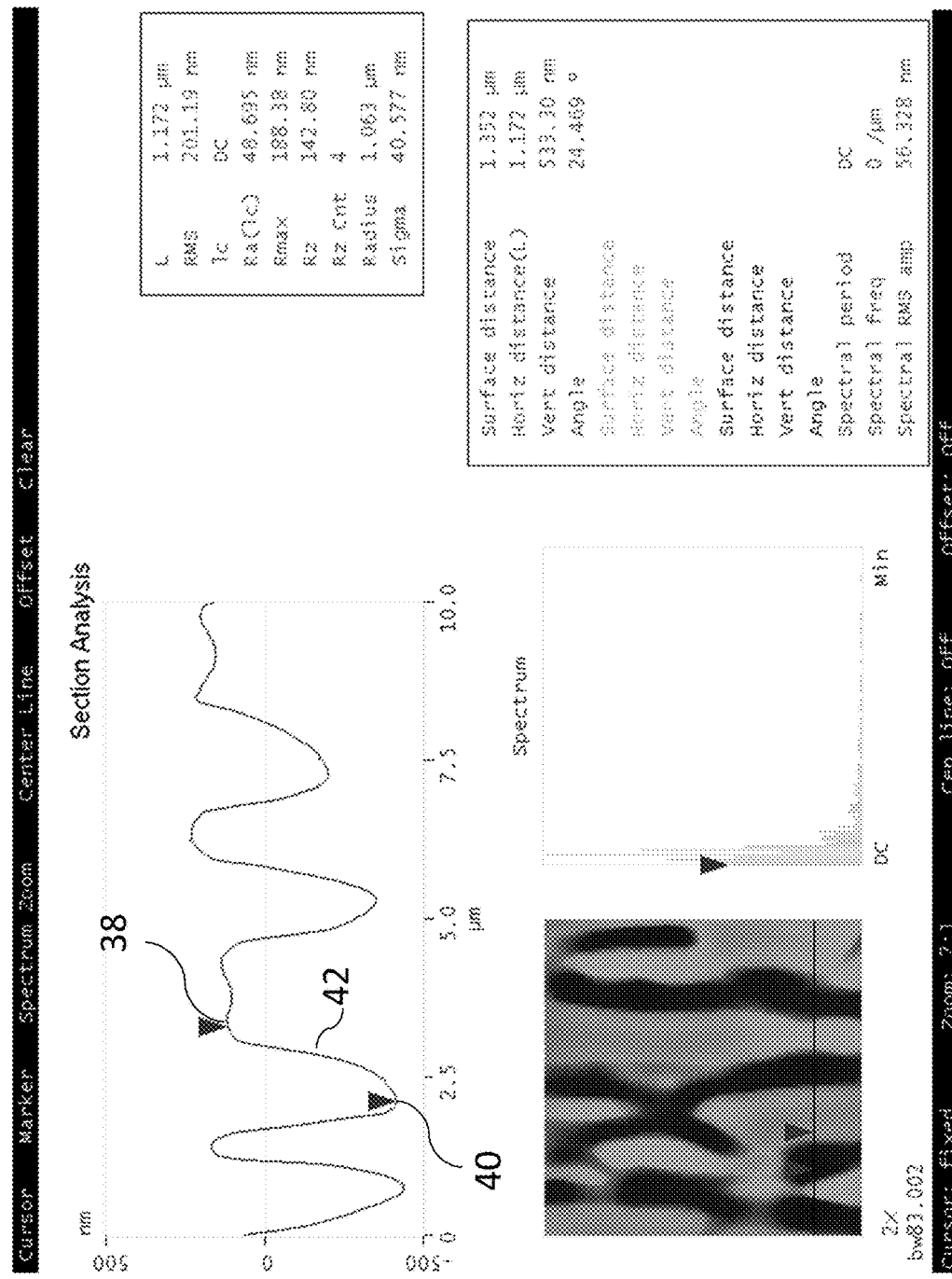
FIG. 10 is a graphical model of the optically variable surface according to one embodiment described herein.
Figure 11:
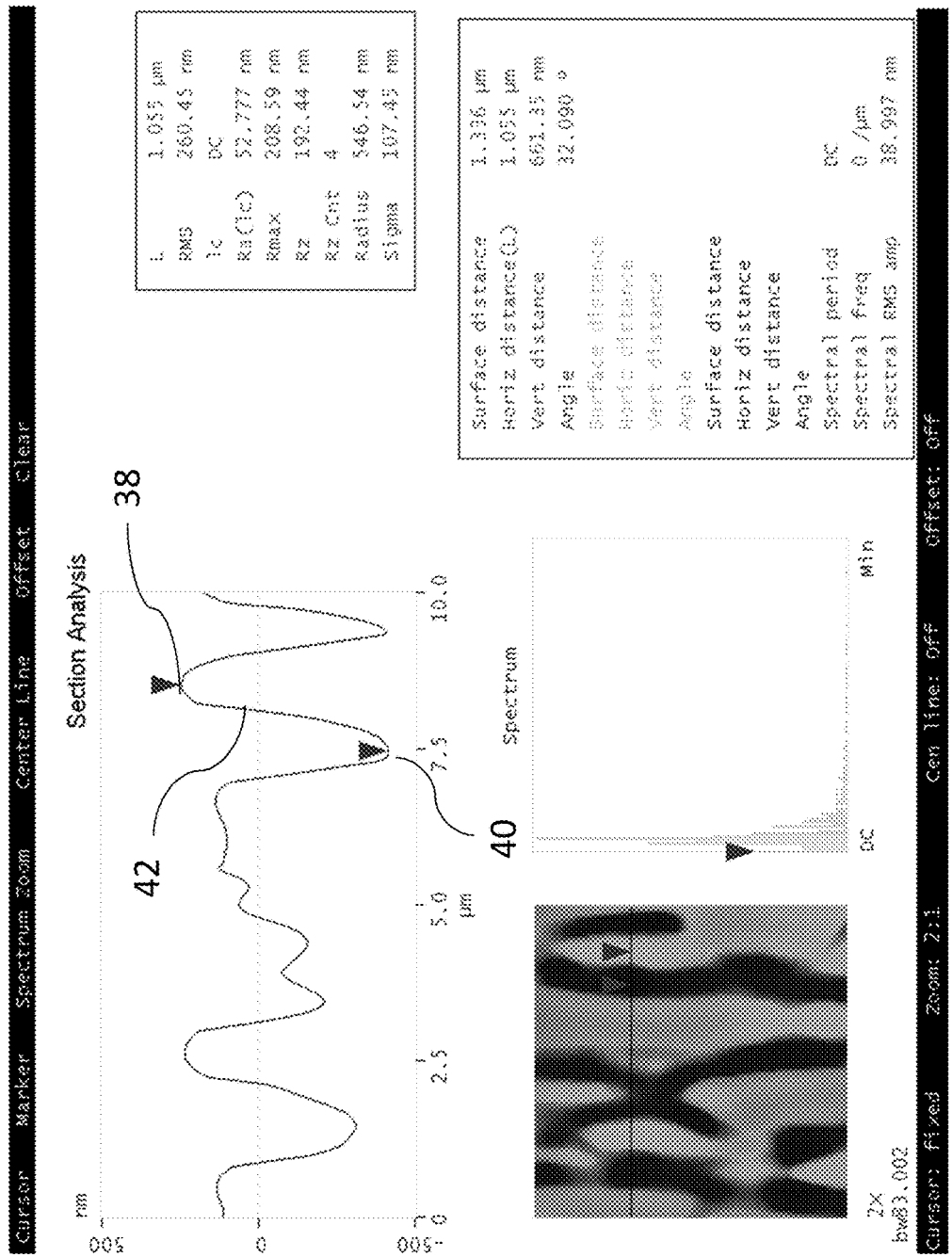
FIG. 11 is a graphical model of the optically variable surface according to one embodiment described herein.

FIGS. 7-11 show examples similar to those shown in FIGS. 2-6, respectively, however, these examples are shown at a 2× magnification. As shown in FIGS. 9-11, for example, feature heights, measured between adjacent peaks 38 and valleys 40, may vary across the surface. For example, at one section, a feature height may be 546 nm (FIG. 9), at another section the feature height may be 533 nm (FIG. 10), and at another section the feature height may be 661 nm. Again, as noted above, these feature heights are presented for the purpose of example only, to demonstrate different feature heights formed across the microstructure in surface of the PET layer 34 according to the embodiment above. The present disclosure is not limited to these examples. Other feature height values may be obtained at different locations, and different feature heights may be formed on a different, subsequently ablated PET layer 34.

In one embodiment, the workpiece 32 or substrate is supported on a stage (not shown) that may be moved incrementally in an X-direction and a Y-direction. By this process, the microstructure or diffraction grating may be formed on the workpiece 32 in a pixel-by-pixel by manner. That is, the microstructure or diffraction grating may be made up of smaller, individual microstructures or diffraction gratings formed by separate exposures to the laser. For example, a pixel may be formed on the workpiece 32, the workpiece 32 may be moved incrementally in the X and/or Y direction, and another pixel may be formed on the workpiece 32. This process may be repeated until the desired number of pixels (i.e., individual microstructures or diffraction gratings) are formed on the workpiece 32.

In one embodiment, the stage may be moved in the X or Y direction in increments corresponding to the desired number of pixels (dots) per inch. For example, the stage may be moved in increments corresponding to 230 dpi, to form substantially discrete pixels on the workpiece 32. The discrete pixels may abut one another, or be spaced from one another. In another embodiment, the stage may be moved in smaller increments, for example, increments corresponding to 230-300 dpi. For example, in one embodiment, the stage may be moved in increments corresponding to 250-280 dpi. In such a configuration, the laser beam may still be sized as described in the embodiments above to produce pixels having a size of 200-230 dpi. However, because the stage is moved incrementally at a higher resolution (e.g., 230-300 dpi), the pixels or diffraction gratings formed on the workpiece may overlap one another, which may enhance a non-chroma visual effect. Alternatively, in other embodiments, the laser(s) may be moved incrementally, in the manner described above, relative to the workpiece 32.

The present disclosure is not limited to the embodiments described above, however. For example, as an alternative to forming the diffraction grating by interfering light beams, in one embodiment, a Space Light Modulator (SLM) system may be used. In the SLM system, a laser may produce enough energy at a focal point to ablate into various materials, such as the PET layer 34. In such an embodiment, digital representations of line spacings may alter grating angle and pitch in the diffraction grating or interference pattern.

After ablating the PET layer as described in the embodiments above, an ablated master may be prepared. To prepare the ablated master, an underlayment (not shown) is formed. In one embodiment, the underlayment may include a substrate and a cover layer. The substrate may be, for example, vinyl or other suitable material and the cover layer may be, for example, a sheet of PET. The PET sheet may be clear. In one embodiment, the substrate may be cleaned with methanol. The cover sheet is disposed on the substrate and a UV curable coating or layer may be applied along a top edge between the cover layer and substrate. The UV curable coating may be, for example, ACTEGA 801h or other similar material. The underlayment may then be moved through a laminator for curing or partial curing. In one embodiment, the underlayment may be moved in line through the laminator to disperse the coating and then under a UV curing lamp for a total cure of about 15-20 millijoule per square centimeter (mJ/cm$^2$). However, the present disclosure is not limited to these parameters, and other speeds and curing parameters may be employed to suitably cure the underlayment.

The PET layer 34, formed with the microstructure 36 in response to exposure to the beam 26, may then be transferred. In one embodiment, the microstructure 36 may be transferred, for example, by a UV casting technique to create a more robust microstructure copy, relative to the PET, suitable for metalizing or electroplating. To facilitate the transfer, cover layer is removed from the underlayment and the PET layer 34 is disposed face (microstructure side) down on the underlayment. In one embodiment, before positioning on the underlayment, the PET layer 34, and in particular, the microstructure 36 may be treated, for example with a particle roller, to remove particles, cured, for example by UV curing. In one embodiment, the UV curing may occur in an oven at about 45 mJ/cm$^2$, but the present disclosure is not limited thereto.

In some embodiments, waste catches may be positioned, for example, by taping, to an end of the underlayment/PET layer combination. A suitable paper (not shown), for example, a white vinyl paper or the like, may be placed over the PET layer 34. The PET layer 34 and paper may be peeled back from the underlayment and a mixture is poured along a top area to flow into gaps between the PET layer 34 and the underlayment to the form the UV curable cast. The mixture may be, for example, a combination of one or more of a UV curable and a silicone additive. In one embodiment, the UV curable may be, for example, ACTEGA 801h or the like, and the silicon additive may be, for example, VPS Sivo 181 or a silicon supplied by EVONIK. The silicon may assist in removal of the UV curable cast from the PET layer 34.

Subsequently, the PET layer 34 and the paper layer may be lifted from the back and moved in line through a laminator to disperse the coating and then under a UV lamp for curing. In one embodiment, the PET layer 34 may cure at about 45 mJ/cm$^2$. However, different suitable curing intensities are envisioned and the present disclosure is not limited to the examples described herein. The paper layer may then be discarded and the PET layer 34 may be peeled from the underlayment. The PET layer 34 and/or the UV curable cast may be subsequently post cured. In one embodiment, the PET layer 34 and/or the UV curable cast is post cured five times at about 450 to 550 mJ/cm$^2$ in a UV curing oven. However, other suitable energies may be used as well. Additional copies may be made directly on the substrate or underlayment, using a UV curable substance, such as ACTEGA 801h and a silicon additive, such as TEGO RAD 2250 or the like. Alternatively, in one embodiment, the PET layer 34 may be used as the master.

Subsequently, the master, for example the PET layer 34 or copy of the PET layer, having the microstructure or diffraction grating formed thereon may be itself vacuum metalized or copied by electroforming to be used as a stamp or press in an embossing process. In one embodiment, a shim, typically formed from nickel or the like is electroformed from the master and applied to an embossing cylinder for mass replicating rolls of optically variable film. Because the PET master's microstructure may have considerably more depth compared to polyimide masters, it may be beneficial to apply an increased weight of embossable coating to the above rolls of substrate to accurately replicate the microstructure.

In the embodiments above, an optically variable film may be formed by the PET layer 34 having the microstructure 36 formed thereon, or a copy of the microstructure 36 formed, for example, by the processes above. The optically variable film may also be a reflective material that has been stamped or otherwise imprinted with the microstructure 36 from the PET layer. The optically variable film may further include a backing layer, such as a backing paper or the like.

Figure 12:
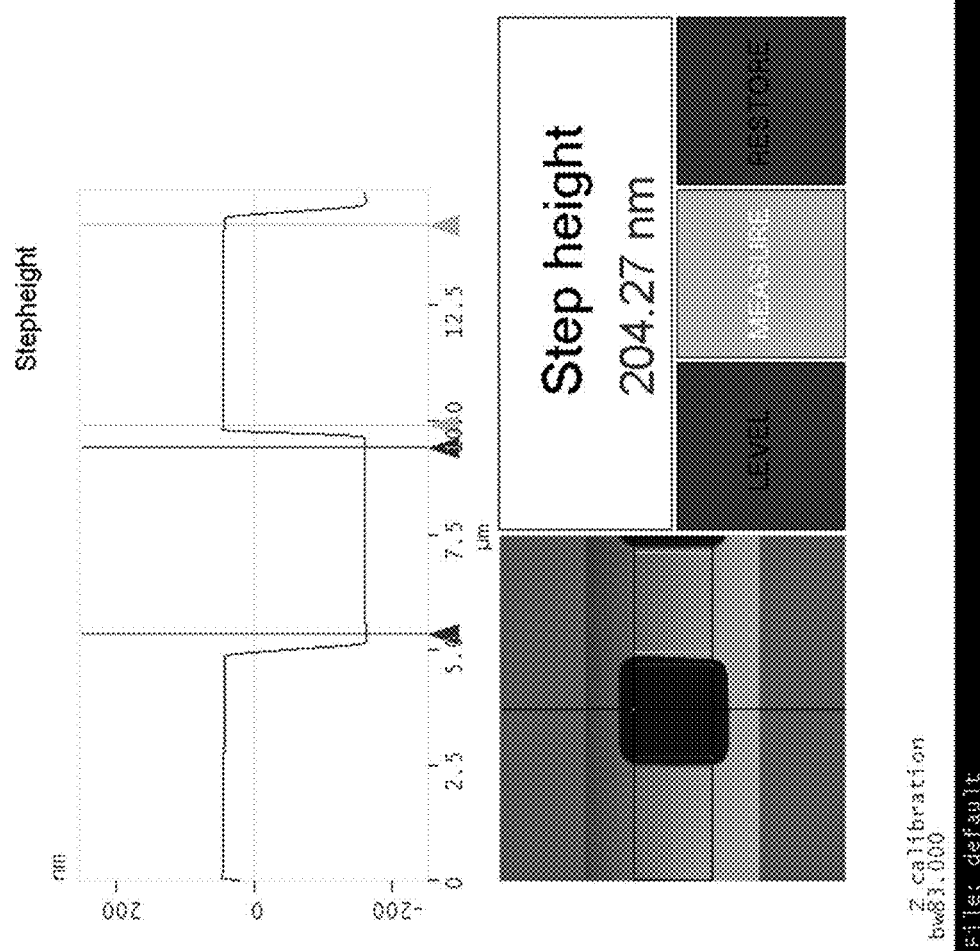
FIG. 12 is a graphical model of a calibration check according to one embodiment described herein.
Figure 13:
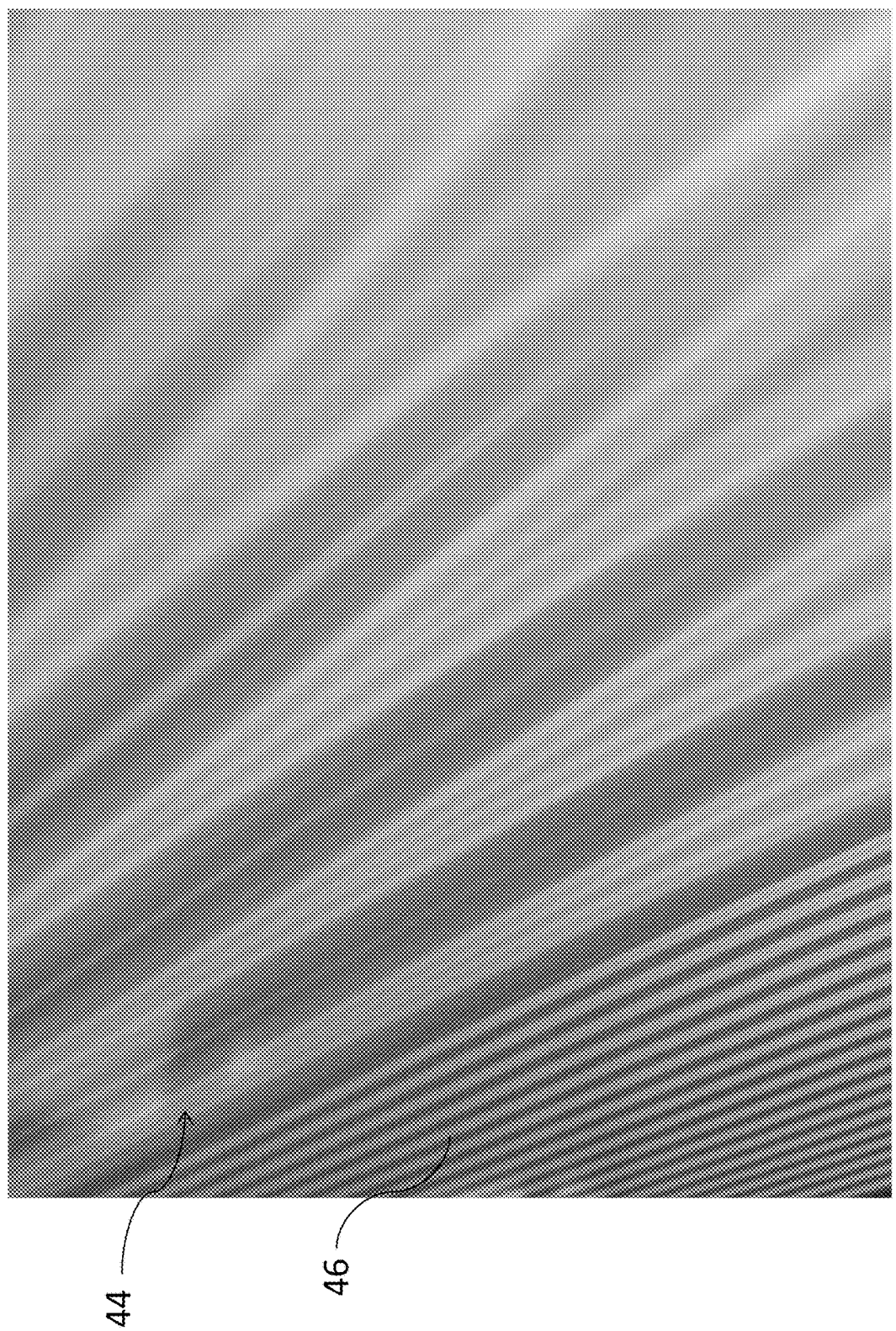
FIG. 13 is an example of the optically variable surface according to one embodiment described herein.

FIG. 12 shows an example of a calibration check used, for example, in measuring of the feature heights described above. FIGS. 13-16 shows examples of optically variable films 44 produced according to the methods and procedures described herein.

Referring to FIGS. 13-16, an optically variable film produced according to the techniques described herein may be produce a substantially non-chroma visual effect 46. That is, the optically variable films according to the embodiments above may produce a visual effect that is substantially or entirely within a range of frosted whites and greys. In other words, the visual effect is substantially free of multi-chroma or "rainbow" type effects. The non-chroma visual effect may be attributed, at least in part, to the randomized microstructure 36, which results in a low energy reflection of light.

Figure 14:
FIG. 14 shows examples of the optically variable surface according to embodiments described herein.
Figure 15:
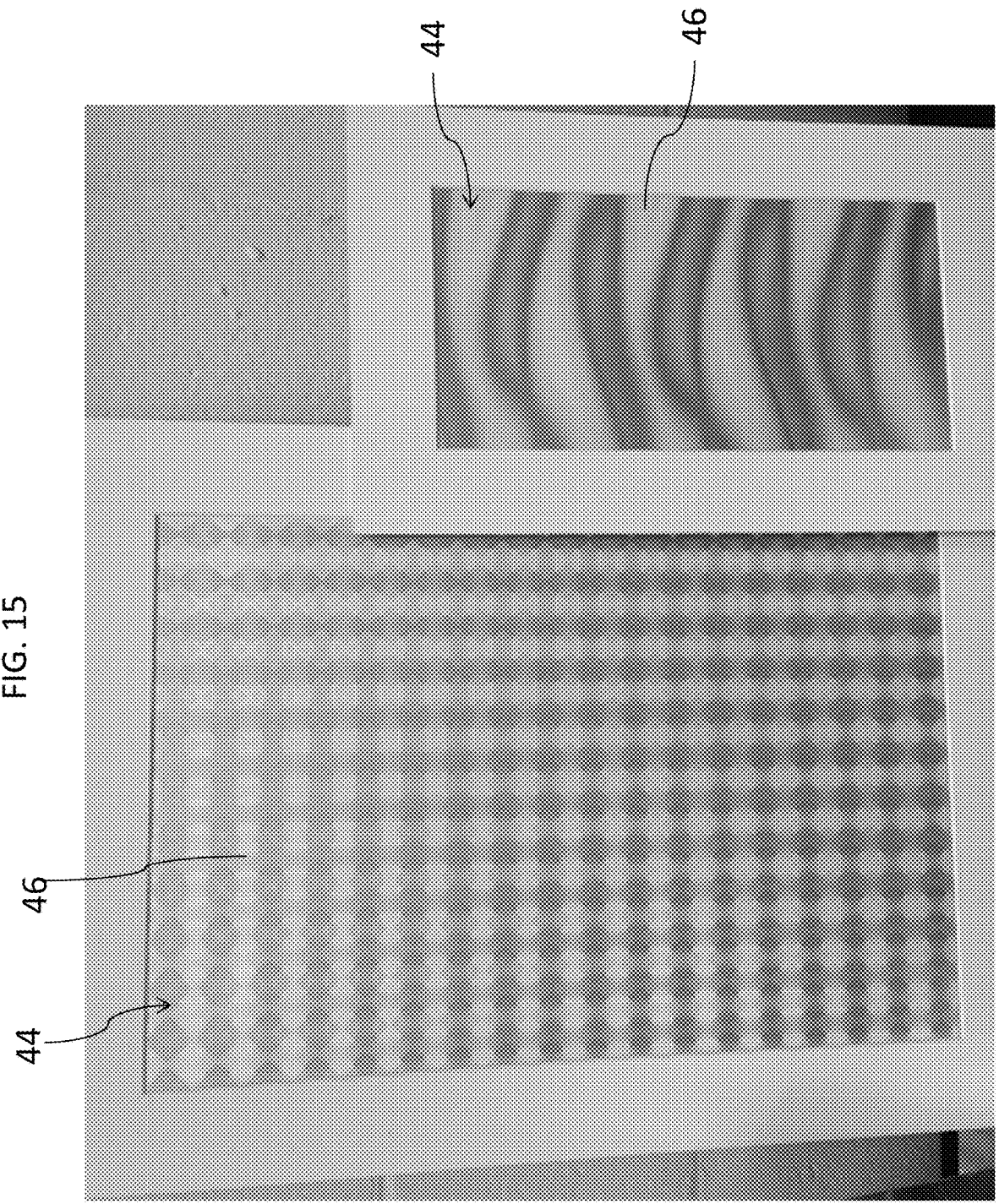
FIG. 15 shows examples of the optically variable surface according to embodiments described herein.
Figure 16:
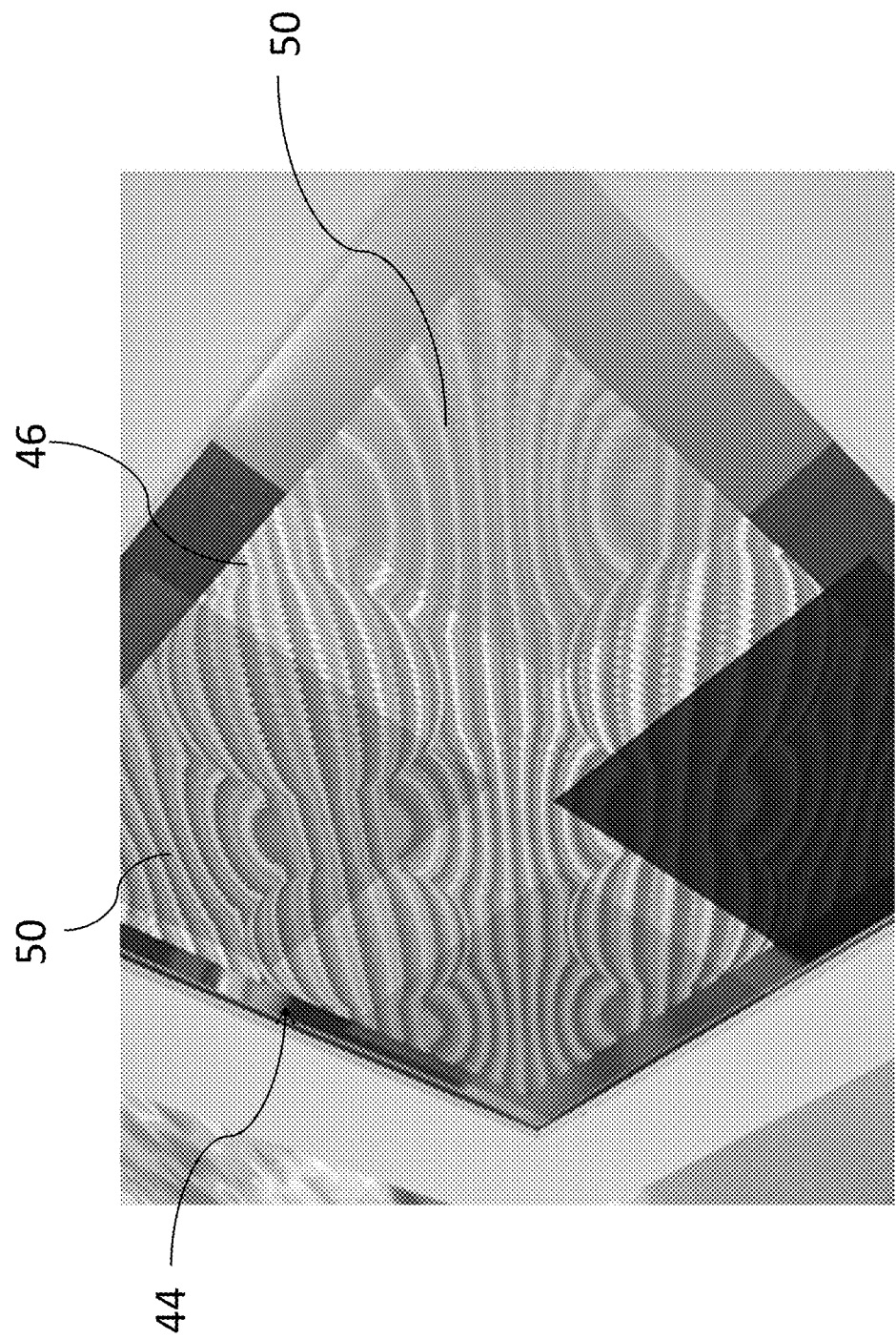
FIG. 16 shows examples of the optically variable surface according to embodiments described herein.

However, in some embodiments, the optically variable film 44 may be formed with non-chroma sections 46, as detailed above, as well as with multi-chroma sections 48, shown, for example, in FIG. 14. The multi-chroma sections, which may produce, for example, the "rainbow" type visual effect, may be formed by adjusting the operating parameters of the apparatus 10. For example, by reducing laser 12 power to approximately 50% and adjusting the first and second lenses 28, 30 of the telescoping lens section 14, a predetermined, predictable and reproducible pattern may be ablated into the surface of the PET layer 34 ultimately allowing for the multi-chroma effect in a film produced with the PET layer 34. Thus, the same apparatus 10 may be used to produce workpieces, e.g., the PET layer 34, suitable for forming both non-chroma and multi-chroma films. It is understood that in some embodiments the microstructure of the workpiece may be formed entirely as a non-chroma or multi-chroma microstructure as desired. Further, substantially monochromatic sections 50 may be formed by coloring a section of the optically variable film with a desired overprint color, for example, as shown in FIG. 16.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. An apparatus for producing an optically variable film comprising:
   a laser configured to emit a beam, the laser operated at a predetermined power level;
   a telescoping lens section comprising a first lens and a second lens spaced apart by a first distance, the first lens having a first focal length and the second lens having a second focal length; and
   an interferometer configured to direct the beam toward a polyethylene terephthalate (PET) workpiece,
   wherein the beam is split in the interferometer and directed toward the PET workpiece as a split beam,
   wherein the beam is energized to have a beam energy based on the predetermined power level, the first distance, and the first and second focal lengths, the beam energy being sufficient to ablate a surface of the PET workpiece upon interference of the split beams at the PET workpiece surface to form a randomized microstructure in the PET workpiece surface in response to a controlled exposure to the beam, and
   wherein the randomized microstructure is formed having a plurality of peaks, valleys, and slopes extending between the peaks and valleys, the peaks and valleys randomly positioned such that the randomized microstructure has randomized pitch frequencies, and the peaks are at randomly formed peak heights, and the valleys are randomly formed valley depths.

2. The apparatus of claim 1, further comprising one or more beam waist lenses and one or more mirrors disposed between the laser and the telescoping lens section for directing the beam through the apparatus.

3. The apparatus of claim 1, wherein the first and second lenses are positioned on axis and the first distance is about 10.5 inches.

4. The apparatus of claim 3, wherein the first focal length is about 200 mm and the second focal length is about 80 mm.

5. The apparatus of claim 1, wherein the laser is a 266 nm laser and the predetermined power level is between about 66% and 72% power.

6. The apparatus of claim 5, wherein the predetermined power level is about 68% power.

* * * * *